United States Patent [19]
Bledsoe

[11] Patent Number: 6,125,694
[45] Date of Patent: Oct. 3, 2000

[54] CIRCUMFERENTIALLY DISPOSED AUTOMATIC WHISTLING TIRE PRESSURE GAUGE WARNING AND LIMITING ASSEMBLY

[76] Inventor: Douglas K. Bledsoe, 1309 W. Brushy Valley Dr., Powell, Tenn. 37849

[21] Appl. No.: 09/400,695

[22] Filed: Sep. 22, 1999

[51] Int. Cl.$^7$ .................................................. B60C 23/02
[52] U.S. Cl. .............................................................. 73/146.8
[58] Field of Search .................................... 73/146, 146.2, 73/146.3, 146.5, 146.8; 340/442–448; 116/34 R, 34 A, 34 B

[56] References Cited

U.S. PATENT DOCUMENTS

| | | | |
|---|---|---|---|
| 3,659,264 | 4/1972 | Barabino | 340/58 |
| 3,807,432 | 4/1974 | Cain | 137/224 |
| 5,054,511 | 10/1991 | Tuan et al. | 137/224 |
| 5,275,196 | 1/1994 | Mitchell et al. | 137/224 |
| 5,365,967 | 11/1994 | Moore | 137/226 |
| 5,377,539 | 1/1995 | LaSalle | 73/146.8 |

*Primary Examiner*—Max Noori
*Assistant Examiner*—Abdullahi Aw-musse
*Attorney, Agent, or Firm*—M. Alex Brown, Patent Attorney

[57] ABSTRACT

An audibly reporting and contemporaneous pressure-relief, automatic tire assembly is disclosed for use in interaction with preexisting valve core stems on a tire of other vessel or with conventional tire rim inflation holes. The assembly of the invention has a channeled valve body having a moving inside pin, and communication from within its channel to a sound board emission port having check-reed position groove at its other end. A pressure-sensitive arc-like mechanism is provided, fabricated to provide an inwardly closing force equivalent to a preselected pressure limit desired for a respective tire or air/fluid-pressured container. This mechanism is mounted in relation to the valve body and supported by a hollow and ported collar so that it seats and exerts closing force against an exposed portion of the check-reed which sits and can move within its position groove. When air or fluid pressure is provided to the valve body, in installed position, the back pressure from this exerts a corresponding force on the check-reed. When this back-pressure force, representing pressure in the tire/container exceeds the force exerted by the pressure-sensitive mechanism leaning on the check-reed, the check-reed moves within its groove allowing excess pressure above the limit to escape, and contemporaneously reporting an audible whistling sound generated by the sound board conditions created by escaping air in adjoining spaces of the check-reed, check-reed groove, and ported support collar in relation to the valve body.

10 Claims, 8 Drawing Sheets

CIRCUMFERENTIALLY DISPOSED AUTOMATIC WHISTLING TIRE PRESSURE GAUGE WARNING AND LIMITING ASSEMBLY

BACKGROUND OF THE INVENTION

1. Field of the Invention

The present invention relates to gauge devices and methods for measuring the air pressure of a vehicle tire in reference to a preselected tire pressure limit; and providing both audible warning, upon reaching, and releasing or venting of air pressure beyond the preselected pressure limit.

2. Background Information

Those references found, in the process of a search, relating to the present invention, generally, or illustrative of state of the art in related technology; include, by inventor and patent number; the following United States Patents: Hwang, U.S. Pat. No. 5,576,484; Anthony, U.S. Pat. No. 5,560,792; Hwang, U.S. Pat. No. 5,554,803; Heyns, U.S. Pat. No. 5,535,623; Oshita et al., U.S. Pat. No. 5,556,861; Lourelro Benimeli, U.S. Pat. No. 5,518,021; Rabizadeh, U.S. Pat. No. 5,503,012; Hwang, U.S. Pat. No. 5,435,173; Bartscher et al., U.S. Pat. No. 5,400,649; Street et al., U.S. Pat. No. 5,398,744; Foss et al., U.S. Pat. No. 5,386,794; LaSalle, U.S. Pat. No. 5,377,539; Moore, U.S. Pat. No. 5,365,967; Bernoudy, Jr., U.S. Pat. No. 5,325,808; Klink, U.S. Pat. No. 5,325,886; Mitchell et al., U.S. Pat. No. 5,275,196; Tuan et al., U.S. Pat. No. 5,054,511; Keya, U.S. Pat. No. 4,883,107; Keys, U.S. Pat. No. 4,869,306; Greenspan, U.S. Pat. No. 4,763,516; and Cain, U.S. Pat. No. 3,807,432.

Specifically, the Mitchell '196 reference, entitled: "Pressure Relief Valve For Tire Rim," teaches a valve body having first and second chambers separated by a restricted passageway of reduced dimensions, and an inlet connected to the first chamber and an outlet connected to the second chamber; where the valve body is mounted in an opening in a tire rim, with the inlet mounted inwardly, exposed to pressure within the tire, and the outlet exposed to the outside atmosphere. Also taught is a valve member located in its first chamber, seated against a seat at the entrance to its restricted passageway by air pressure acting upon it from inside the tire via the inlet, thus sealing the outlet; or, as taught, the valve member is normally positioned in the first chamber, but is moveable through Mitchell's restricted passageway into its second chamber when exposed to pressures above a predetermined level. In this regard, this restricted passageway acts as a valve seat for sealing engagement with Mitchell's valve member on exposure to air pressures below a predetermined level at Mitchell's valve inlet.

Further, in accordance with Mitchell, either its valve member or the walls of its passageway, or both, are made of a deformable elastomeric material so that when the tire air pressure rises above a predetermined level, its ball member is forced through the passageway into its second chamber, and into a position in which air can flow past the ball and out of its outlet, reducing the internal pressure in the tire.

However, Mitchell teaches a structure substantially different from the present invention, and does not provide audible whistling or warning report, as the present invention does, in association, or contemporaneously with, limiting air pressure in a tire; once the pressure has reached or gone beyond that determined to be within the safety range. Additionally, Mitchell 'must' be mounted on a tire/wheel rim; whereas the present invention can 'also' be mounted in preferred embodiments on the valve stem of a tire, as an extension thereof, thereby utilizing the pre-existing air valve means conventionally available, already, with the tire or rim; without the need to replace this.

Tuan '511, entitled: "Tire Valve Having An Automatic Pressure Release Device," teaches a much more complex and elaborate structure, inherently inefficient, which focuses on a number of additional elements and means, including valve body, inlet assembly, inlet assembly body, valve pole, first biasing means for biasing the valve pole, and inlet/outlet assembly, inlet/outlet assembly body with intake room, releasing room and bypass hole; a one-way intake valve means; and a releasing valve means; together with a number of other structurally different and more complex elements. Also, Tuan's object is to regulate air pressure and to detect the value of the inner pressure. It does not function, however, to both audibly warn of excessive air pressure while, also, contemporaneously limiting and venting this pressure.

LaSalle '539, entitled: "Valve Stem Extender With Integral Air Pressure Gauge," teaches an air pressure gauge provided integrally with a valve stem extender, with different structure and function in relation to the present invention; although it does utilize what it refers to as a 'Boudon tube,' concentrically coiled about the barrel of its valve stem extender, for the purpose of carrying a dial pointer at its outer end to register with a stationary dial face bearing visible indicia indicating tire inflation pressure. LaSalle neither audibly warns of excessive pressure, nor limits or vents it, in substantial distinction with the present invention.

The Moore '967 reference, entitled "Safety Tire Valve," has some functional similarity to the present invention; but is vastly different in its structure, being based in its workings on the function of a structurally and positionally different 'diaphragm spring;' and substantial positional alignment scheme differences, by virtue of its up-and-down, or vertical, structural and functional arrangement.

The balance of the cited prior art is considered to be far less relevant, though forming parts of this diverse and crowded art and technology.

None of the references found in the prior art illustrate or disclose the Circumferentially Disposed Automatic Whistling Tire Pressure Gauge Warning And Limiting Assembly of the present invention. Nor is the present invention structurally obvious in view of any of the prior art references listed. In addition, all of the relevant prior art heretofore known suffer from a number of disadvantages.

None of the prior art devices or methods of their use address serving the purpose of an air pressure warning and limitation, by utilizing a circumferentially disposed, resilience/pressure arch or respectively biased arc spring. Nor do they teach a spring which is individually biased and supported and positionally limited along substantially one axis of elasticity by virtue of both its structural makeup and concentric contact expansion limit means.

Also, none of the prior art devices offer an air pressure gauge limiting and audibly warning assembly of simple, resilient and reliable structure and function.

Further, none of the prior art devices or methods of use, within their preferred embodiments, permit the ability of, both, working in interaction with an already existing tire stem valve provided with a vehicle tire, and the ability of utilization in interaction with a tire or wheel rim, in a total valve replacement capacity.

Additionally, other devices do not offer adequate simplicity of structure and efficiency in their working parts; nor do they offer a simple one chamber or channeled internal structure with simple and effective limiting or venting means.

Also, other devices do not utilize reliable constructive materials in elements of their invention related to air pressure monitoring and limitation of air pressure equal to or below a preselected safety or operating limit.

These and other disadvantages, structurally and functionally, of the prior art, will become apparent in reviewing the remainder of the present specification, claims and drawings.

Accordingly, it is an object of the present invention to provide a tire pressure gauge warning and limiting assembly of simple resilient construction, and small dimensions and weight, to work in interaction with an original tire valve core 'or' as a valve replacement means fitted directly on a tire rim of a vehicle.

It is a further object of the present invention, to provide a more effectively workable, one-chambered, warning and limiting pressure assembly device with superior mechanical advantage.

Yet a further object is to provide a warning and limiting air pressure gauge apparatus which effectively utilizes a circumferentially disposed and positioned resilience, pressure-sensitive biasing arch; or individually (or respectively) biased arc-like spring.

It is also an object of the invention to provide such an arc-like spring which is individually biased, and supported and positionally limited, in preferred embodiments, by virtue of both its structural constructive materials-makeup and its concentric or circumferential included expansion limit means.

A further object is achieved by the present invention of providing an automatic warning and limiting tire pressure gauge designed to set the tire pressure for each individual vehicle tire.

Yet another object of the invention is to provide an automatic tire pressure gauge, for warning and limitation of excessive tire air pressure, which operates on the basis of a tempered arc-like or circumferential spring set to the desired PSI and a responsive, circumferentially adjoining and positioned check or relief sphere; so that this spring and sphere act to release air when the desired air pressure is reached; and the sphere and its adjoining space portions contemporaneously define and create acoustic-sound board conditions so that an audible whistling warning sound is emitted.

A further object of the invention is to provide an automatic tire pressure gauge and pressure-limit and warning device which also works as a valve core extension, remaining in an installed position, if so desired, as a permanent or semi-permanent fixture on the original tire valve core.

And yet a further object is to provide an air pressure warning and limiting valve fixture permitting the user to attach an air hose to it, and remove the air hose when the invention's 'whistle' warning is heard (or perceived) and excess air is expelled.

It will, therefore, be understood that substantial and distinguishable structural and functional advantages are realized in the present invention over the prior art devices; and that the present invention's novel and efficient structure, diverse use and utility and broad functional applications serve as important bases of novelty and distinction over the prior art in this regard.

SUMMARY OF THE INVENTION

The foregoing and other objects of the invention can be achieved with the present invention, assembly, device and method of use, which is an automatic tire pressure gauge warning and limiting assembly. The invention is utilized for providing an audible warning of, and self-initiating and contemporaneous release of, air or fluid pressure rising to or above a preselected operation and safety limit in a vehicle tire or like structure. The invention is provided with a valve body having first and second ends; and first, middle and second cross-sectional subportions. The valve body is provided with an internal valve pin channel having diameter dimensions generally extending, internally and axially therein, between the first and second ends; and having first, middle and second channel portions. The first and second channel portions have respective dimensioned diameters greater than that of the middle channel portion. The middle cross-sectional subportion has first and second ends defining its length thereof. The first end defines and has a first flange member and the second end defines and has a second flange member. The middle cross-sectional subportion is further provided with a side periphery which defines its width. The first and second flange members each extend outboard, widthwise, in relation to the side periphery of the middle cross-sectional subportion. This side periphery has outward and internal surfaces. The internal surface adjoins and communicates with the internal valve pin channel; and the outward surface defines a check-reed position groove. The side periphery is further provided with a sound board emission port, extending therein between the check-reed position groove and the internal valve pin channel.

The invention is further provided with a valve pin member having first and second end portions, and a middle portion located lengthwise therebetween. The first and second end portions each have a widthwise dimension which is greater than that of the middle portion. The valve pin member is slideably installed in the middle channel portion of the internal valve pin channel so that the valve pin member moves along its middle portion between its first and second portions. The invention is also provided with a spherical check-reed member having a rounded periphery surface, which is pivotally and vibrationally mounted in the check-reed position groove so that part of the rounded periphery surface is exposed to extend out of the check-reed position groove. The invention further has a pressure sensitive arc means for positionally supporting and circumferentially biasing the spherical check-reed member at a selected force equivalent equal to a desired air or fluid pressure limit. By this means the spherical check-reed member is held in position in accordance with the selected force and will not move or vibrate until the selected force is exceeded. This pressure sensitive arc means is attached to and supported by the side periphery of the middle cross-sectional subportion of the valve body. The invention also has a collar retention member having first and second ends and a rounded periphery side between it ends. The collar retention member is provided with a hollow installation channel extending between its first and second ends. The rounded periphery side of the collar retention member is provided with a orificial sound board emission port therethrough. This collar retention member is releasably attached to the valve body so that its hollow installation channel abuts each of the first and second flange members of the middle cross-sectional subportion.

REFERENCE NUMBERS IN DRAWINGS

10 Assembly of the present invention
12 valve body
14 first end of (12)
16 second end of (12)
18 first cross-sectional subportion of (12)
20 middle cross-sectional subportion of (12)
22 second cross-sectional subportion of (12)
24 first end of (20)
26 second end of (20)
28 internal valve pin channel of (12)
30 first channel portion of (28)
32 middle channel portion of (28)
34 second channel portion of (28)
36 first flange member of (24)
38 second flange member of (26)
40 side periphery of (20)
42 outward surface of (40)
44 internal surface of (40)
46 check-reed position groove
48 sound board emission port
50 valve pin member
52 first end of (50)
54 middle portion of (50)
56 second end of (50)
58 spherical check-reed member
60 rounded periphery surface of (58)
61 pressure sensitive arc means
62 collar retention member
64 first end of (62)
66 second end of (62)
68 rounded periphery side of (62)
70 hollow installation channel of (62)
72 orificial sound board emission port of (62)
74 area of (34)
76 side periphery section of (18)
78 first end of (18)
80 second end of (18)
82 threaded area of (76)
84 washer member
86 dust cover
88 first end of (86)
90 second end of (86)
92 side periphery wall of (86)
94 cover portion of (86)
96 internal securement channel of (86)
98 tempered arch-spring of (61)
100 inboard perimeter surface of (98)
102 outboard perimeter surface of (98)
104 first end of (98)
106 second end of (98)
108 inward/closing biasing force direction of (98)
110 attachment flap portion of (98)
112 inboard surface of (110)
114 outboard surface of (110)
116 first end perimeter of (110)
118 second end perimeter of (110)
120 support hole of (110)
122 attachment member
124 adapted internal valve core channel
126 valve core
128 first end of (126)
130 second end of (126)
132 threaded extension portion
134 first end of (132)
136 second end of (132)
138 periphery wall of (132)
140 inflation interface channel of (132)
142 washer and nut-locking means
144 first washer
146 second washer
148 locking nut
150 tire rim
152 outside widthwise periphery of (150)
154 inside widthwise periphery of (150)

DETAILED DESCRIPTION OF THE PREFERRED EMBODIMENTS OF THE INVENTION

The following description of the preferred embodiments of the concepts and teaching of the present invention is made in reference to the accompanying drawing figures which constitute preselected illustrated examples of the structural and functional elements of the invention, among many other examples existing within the scope and spirit of the invention.

Referring now to the drawings, FIGS. 1, 2, 3A, 3C, 7A, 7B, 7C, 8 and 11, thereof, there is shown a circumferentially disposed automatic whistling tire pressure gauge warning and limiting assembly 10, of the present invention, referred to herein as the "Assembly" 10.

The Assembly 10 is utilized, in preferred embodiments, in interaction with a valve core stem (and its contained valve means) of a vehicle tire; including, but not limited to, automobile, trailer, airplane and other such tire or moveable support means which are inflated with air; or in interaction with reservoirs, vessels, balls, tanks or other containers which are pressurized by air or fluid pressure. The Assembly 10 provides a novel means for providing an audible warning and self-limiting contemporaneous (occuring during the same related period of time) automatic release of air or fluid pressure in a container, such as a vehicle tire, which rises to, or above, a preselected operational or safety pressure limit; such as, for example, 32 psi (pounds per square inch) or 50 psi commonly recommended for vehicle tires, or other such appropriate limits for such pressurized containers or units.

Figure 1:
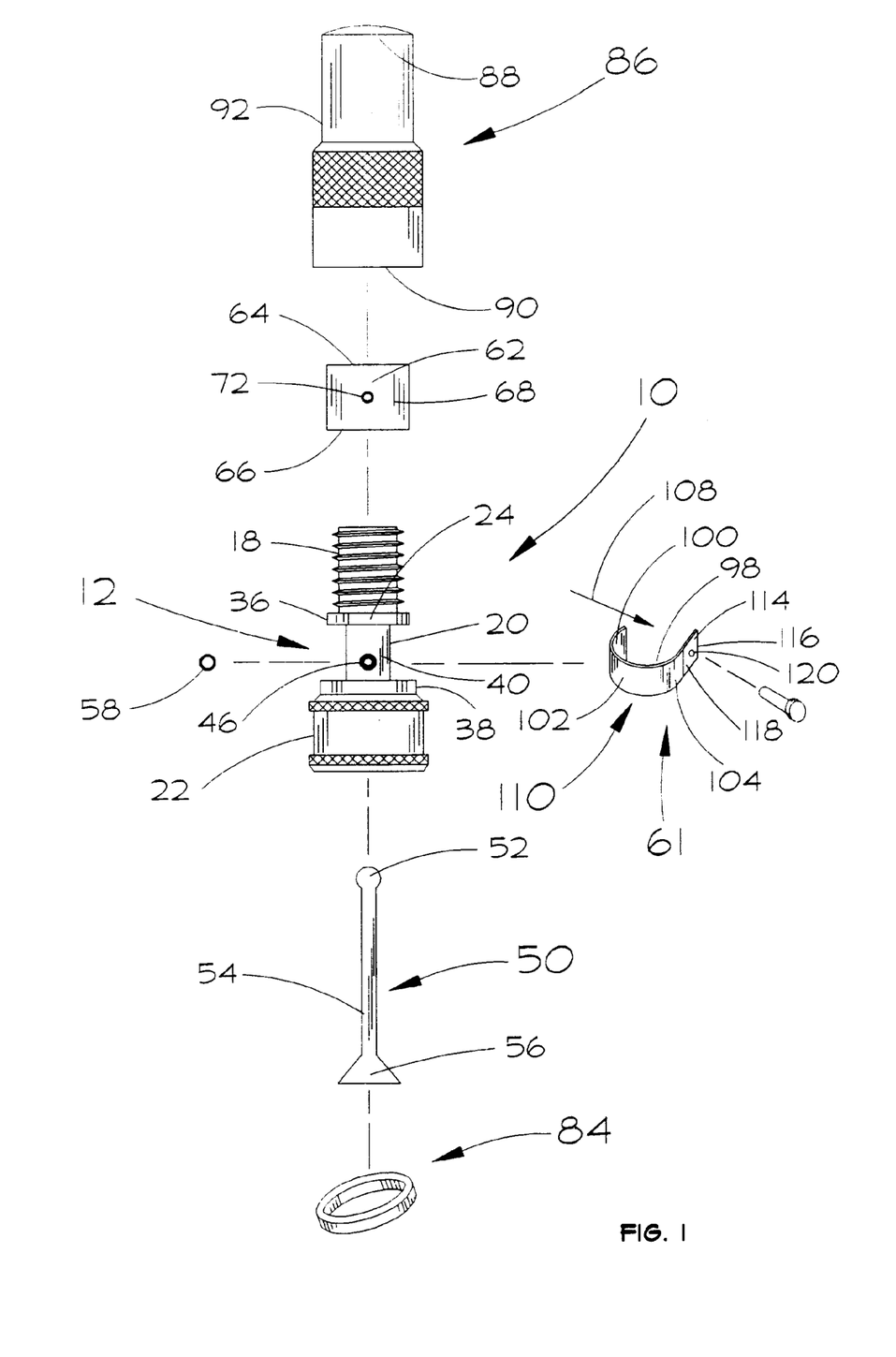
FIG. 1 is an exploded perspective view of one preferred embodiment of the circumferentially disposed automatic whistling tire pressure gauge warning and limiting assembly of the present invention.

The Assembly 10 is provided with the valve body 12 having the first end 14, the second end 16, the first cross-sectional subportion 18, the middle cross-sectional subportion 20, and the second cross-sectional subportion 22, when the Assembly 10 is integrally assembled, in a preferred embodiment, as illustrated by example in FIG. 1.

The middle subportion 20 is provided with the first end 24 and the second end 26, at either end of its length, as illustrated in FIGS. 1, 2, 3A and 11. The valve body 12 has and defines the internal valve pin channel 28, which, preferably, is substantially, or generally, rounded and diametered in its internal dimensions. The valve pin channel 28 extends generally the axial internal length of the body 12, from its first end 14 to its second end 16; and is, itself, provided with the first channel portion 30, the middle channel portion 32 and the second channel portion 34. In their widthwise or diameter dimensions, the first and second channel portions 30 and 34, respectively, are greater in dimension than that of the middle channel portion 32, as illustrated by example.

The first end 24 of the middle subportion 20 is provided with, or defines, the first flange member 36; and its second end 26 has, or defines, the second flange member 38. The middle subportion 20 is further provided with its side periphery 40, generally defining its width, and establishing an axis generally transverse to the lengthwise positional axis of the first and second ends 24 and 26, as illustrated by example in FIG. 11 and other drawings herein.

Also, as illustrated, by example, the first and second flange members 36 and 38, each, extend, in their positional placement or orientation; outboard, widthwise, from, or in relation to, the side periphery 40.

Additionally, the side periphery 40 is, preferably, provided having at least outward and internal surfaces, 42 and 44, respectively. In this regard, the internal surface 44 adjoins and communicates with the internal valve pin channel 28; and the outward surface 42 is provided with, and defines, the check-reed position groove 46, illustrated in these presently described embodiments at FIGS. 1 and 11.

The side periphery 40 is further provided with the sound board emission port 48, which extends within the side 40, in channel-like fashion, between the check-reed position groove 46 and the internal valve pin channel 28.

The Assembly 10 is further provided with the valve pin member 50, illustrated in FIGS. 1, 3B, 3C and 11, which has first and second end portions 52 and 56, respectively; and the middle portion 54, positioned along the length of the valve pin 50 between the first end 52 and the second end 56. In this regard, the ends 52 and 56, each, respectively, have a greater widthwise or diameter dimension than that of the middle portion 54, as illustrated by example. The valve pin 50 is installed in the middle channel portion 32 of the valve pin channel 28 so that it can slide, pivot or otherwise move along its middle portion 54, between its first and second ends 52 and 56.

The spherical check-reed member 58 of the Assembly 10 is preferably provided with a rounded periphery surface 60, as shown by general examples in FIGS. 1, 2, 4, 6, 10 and 11. The check-reed member 58 is dimensioned and mounted in the check-reed position groove 46 so that it can be moved, positioned and/or vibrated; and so that part of its rounded periphery surface 60 is exposed outboard of, or extending exposed away from, the check-reed position groove 46.

Figure 11:
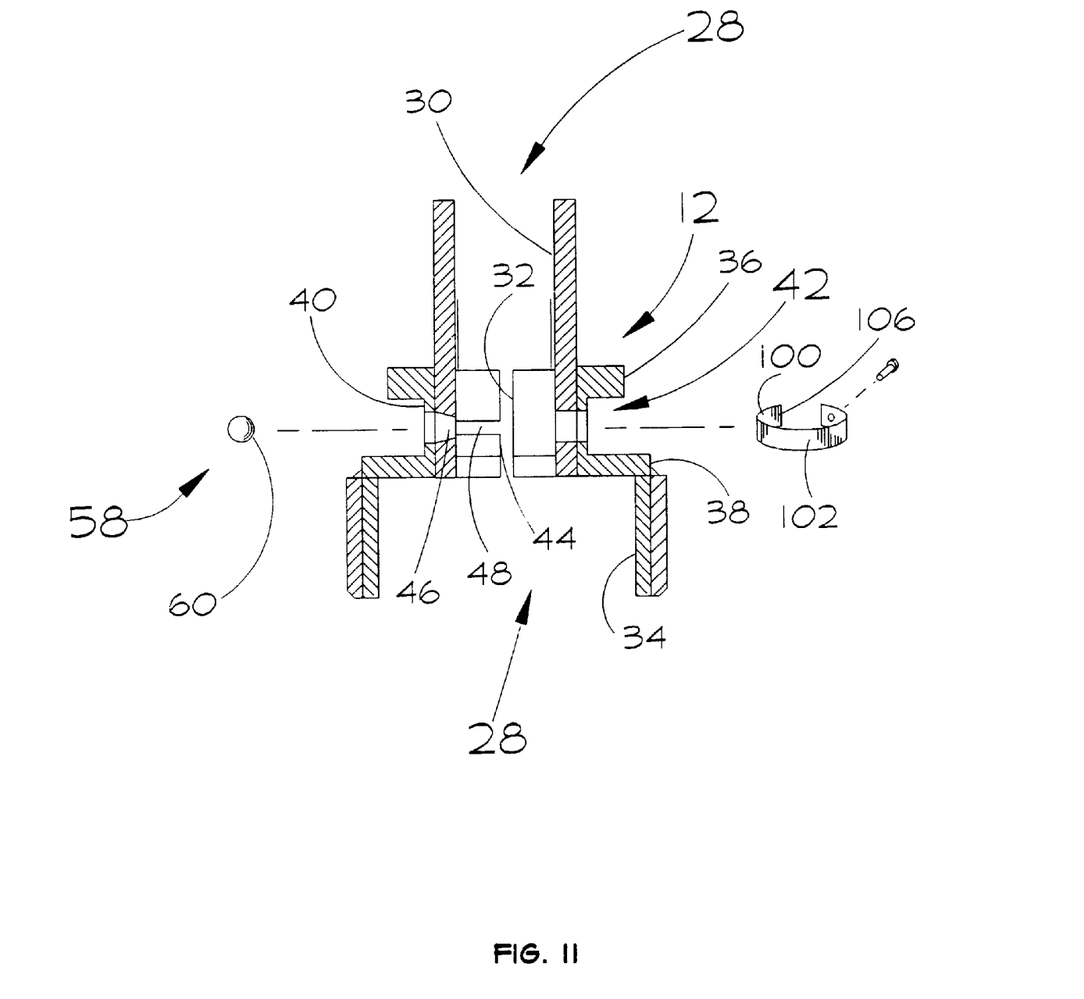
FIG. 11 is an enlarged cross-sectional view of another embodiment of the invention related to that of FIG. 1.

The Assembly 10 is novelly provided in accordance with its use, with pressure sensitive arc means 61 (or its system or mechanism therefor), generally illustrated, by example, in FIGS. 1, 11 and other drawings; for the purpose within the invention of positionally supporting and circumferentially (or by virtue of a generally rounded, circular or circle-like imposed biasing force along a limited vector or axis) biasing the check-reed member 58 at a selected force (or biasing) equivalent equal to a desired air/fluid pressure limit, so that the check-reed member 58 is held in position, along a part of its extended periphery surface 60, in accordance with the selected biasing force of the arc means 61, and will not move or vibrate until this selected force is exceeded. The arc means 61 is attached or affixed, by any of a number of means or ways, to the side periphery 40 of the middle subportion 20 of the valve body 12.

Figure 2:
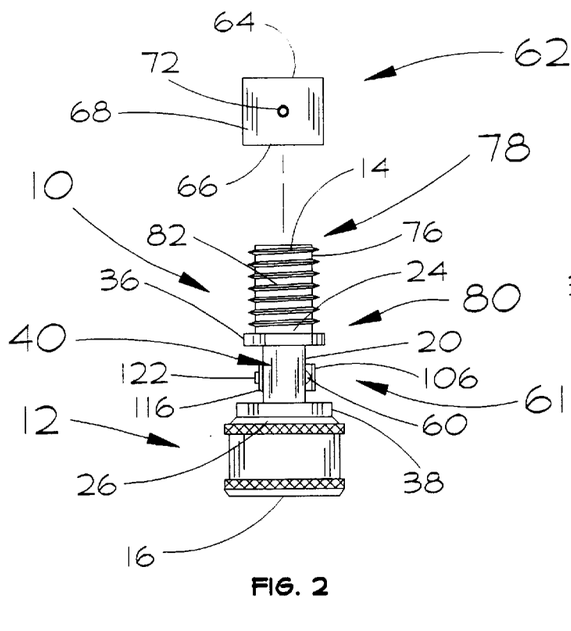
FIG. 2 is a front side perspective view of part of the assembled elements of the invention embodiment of FIG. 1, illustrating the collar of the invention in partial exploded view.
Figure 3A:
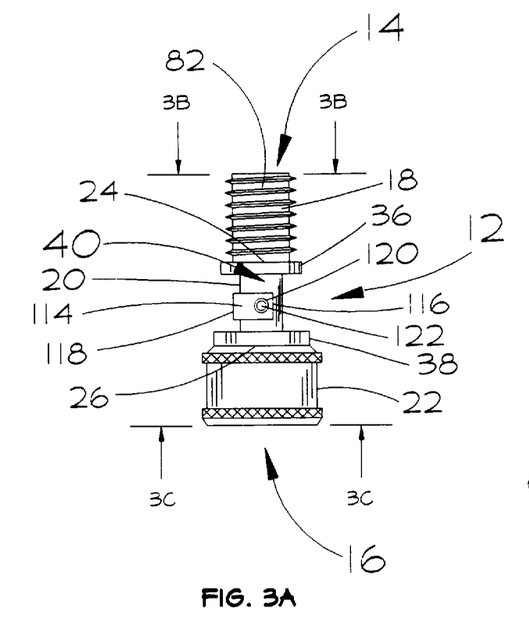
FIG. 3A is a back side perspective view of the invention embodiment of FIG. 2, not illustrating the collar of the invention.
Figure 3B:
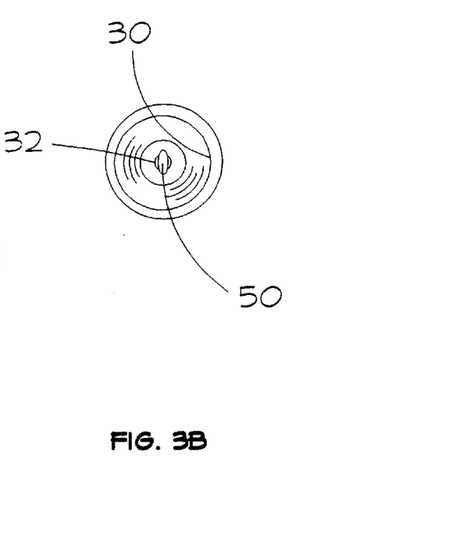
FIG. 3B is an elevated top view of the invention embodiment of FIG. 3A.
Figure 3C:
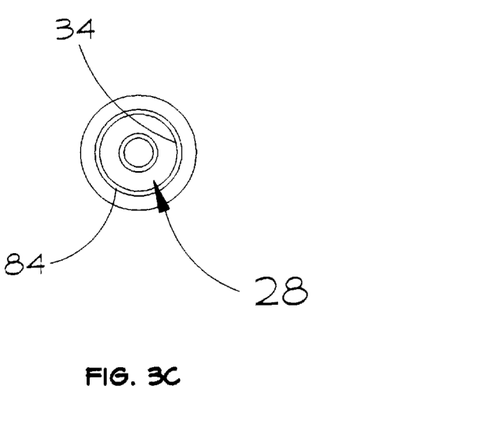
FIG. 3C is a bottom view of the invention embodiment of FIG. 3A.
Figure 4:
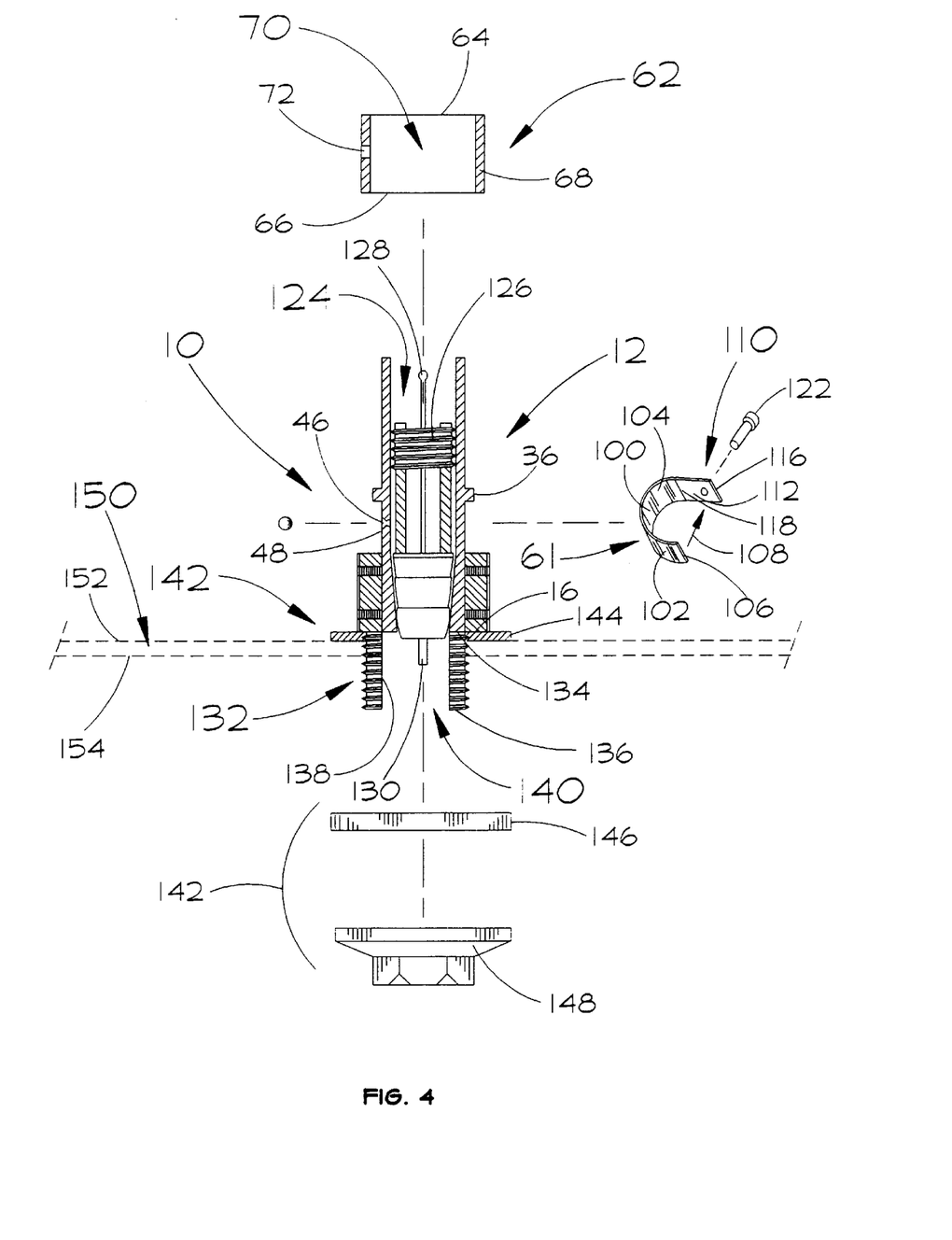
FIG. 4 is a side partial cross-sectional view of another embodiment of the present invention, showing, by example, a widthwise periphery of a conventional tire rim in broken-lines, and a valve core in general detail.

The Assembly 10 is further provided with the collar retention member 62, illustrated by example in FIGS. 1, 2 and 4; which has first and second ends 64 and 66, and the rounded periphery side 68 between the ends 64 and 66. The collar 62 is also provided with its hollow installation channel 70, internally, between its first and second ends 64 and 66. The periphery side 68 is provided with, and defines, the orificial sound board emission port 72.

The collar 62 is attached to the general area of the middle subportion 20 of the valve body 12 in preferred embodiments; although it will be understood within the scope and spirit of the invention that it can otherwise be attached to the valve body 12. The collar 62 is, additionally, preferably dimensioned and designed to slide over the area of the middle subportion 20 with its installation channel 70, so that it abuts, or lies positionally flush or close to each of the first and second flange members 36 and 38 of the middle subportion 20.

In related preferred embodiments of the Assembly 10, the first cross-sectional subportion 18 has an outwardly or laterally, positionally oriented, side periphery section 76; extending between its first and second ends 78 and 80, which is preferably circumferential in its configurational perimeter, as illustrated by example in FIGS. 1, 2, 3A and 11. The side periphery section 76 is provided, preferably, at least in part, with threaded area 82.

Also, in related embodiments, the second end 66 of the collar 62 is positioned adjacent to the second cross-sectional subportion 22 while being installed over and abutting the first and second flange members 36 and 38.

The collar 62 thereby acts in these related embodiments to provide a stop-limit position and related positional support to the arc means 61 when the Assembly 10 is operational in the event this is needed because of the forces imposed on the arc means 61 due to back pressure or escaping air or fluid. The orificial sound board emission port 72 of the collar 62 also plays a functional part of the operation of the Assembly 10 in enhancing or further producing the audible whistling sound reported from the Assembly 10 when the back pressure above a desired limit is expelled through the sound board emission 48 and passes through the port 72, discussed in greater detail herein.

With respect to the valve pin member 50, it will be understood within the scope of the invention that its movement is brought about by an axial abutment or extending protuberance or depression 'extension' which is normally or conventionally provided on, or as a part of, an air or fluid supply line or hose; and that this 'extension' normally serves to depress the 'conventional pin' (or small rod member) extending from a valve and valve stem on a vehicle tire, for the purpose of depressing the tire valve to permit an open-position for providing air to the tire.

In the case of the present invention the valve pin member 50 of the Assembly 10, installed in interaction with a tire valve stem, is depressed by the air hose 'extension' when the air hose is applied to the first end 14 of the valve body 12, which acts to slide or pivot the pin 50 along its middle portion 54, and extend the second end 56 of the pin 50 into biasing or pushing position with the 'conventional pin' extending from the valve stem of the tire; resulting in its depression and the ability of the Assembly 10 to, both, act as a conduit of air or fluid being supplied to the tire (or like container) and its ability to sense, gauge and automatically respond to the back pressure of the tire in relation to a pressure limit, should it be reached, by virtue of the biasing force factored and designed as a functional part of the arc means 61.

Therefore, when an air pressure dispensing conduit or supply means is connected to the first end 14 of the valve body 12 of the Assembly 10 it creates a back pressure which communicates through the sound board emission port 48 and biases or pushes the spherical check-reed member 58 and the inter-linked, positionally supporting, or proximately adjoining, circumferentially biasing, pressure sensitive arc means 61. In so doing, when the force of the back pressure exceeds the selected force equivalently built into the arc means 61 (whether biased in equivalent force to 12, 15, 20, 25, 30, 32, 35, 40, 42, 45, 50 psi, or some other preselected pressure-force equivalent, so incorporated into the biasing force of the arc means 61), the check-reed member 58 is positioned outboard, distally or laterally spaced away or outside of the check-reed position groove 46, thus opening the sound board emission port 48 to allow the passage and escape of 'above-limit' air/fluid and pressure (or like pressure), permitting it to escape and emit therethrough and to continue on through the orificial sound board emission port 48 of the collar 62, exiting from the Assembly 10 to the ambient environment.

As the back pressure is so exiting, the Assembly 10 contemporaneously reports an audible whistling-type sound (or like sound) by virtue of the air passing through the sound board emission port 48 and the check-reed position groove 46, then around the check-reed member 58 and the biased arc means 61, and then through the orificial sound board emission port 72, and/or parts of, or spaces so adjoining or proximate thereto.

In preferred related embodiments the valve pin 50 is augmented or aided by at least one washer member 84, which can be of a diverse number or types, or provided as multi-fitting members; but which, preferably, is of a doughnut or ring-like configuration having a hole or aperture in the middle thereof. The washer 84, in these preferred embodiments, is installed in the second channel portion 34 of the internal valve pin channel 28, within the second cross-sectional subportion 22; and firmly seated, or sealably positioned, therein to provide augmenting sealing in adjacent or perimeter areas around the interface of the second end 56 of the valve pin 50, and the middle and second channel portions 32 and 34 of the internal valve pin channel 28.

Additionally, the Assembly 10 is, optionally, provided with the dust cover 86, to be utilized when the Assembly 10 is not in operational use; having, at least, first and second ends 88 and 90, and a preferably circumferential side periphery wall 92; as illustrated by example in FIGS. 1, 7B, 7C, 8 and 10. The first end 88 of the dust cover 86 has the cover portion 94; and the dust cover 86 is provided with an internal securement channel 96 which can be threaded, biased or biasing in its internal construction or configuration, or otherwise adopted so that it will secure to or removably/releasably cover the first and/or middle cross-sectional subportions 18 and/or 20 of the valve body 12 when installed at or over the first end 14 of the valve body 12.

In preferred embodiment the pressure sensitive arc means 61 is provided with a single tempered arch-spring 98 having inboard and outboard perimeter surfaces 100 and 102, respectively; and first and second ends 104 and 106, respectively; as illustrated by example in FIGS. 1, 2, 3A, 4, 6 and 11. The arch-spring 98, preferably, is tempered or otherwise biased in arc-like manner and configuration to exert a circumferential biasing force, in an inward or closing biasing force direction 108, generally along a compact or small vector-axis (longitudinally or laterally oriented), as shown generally by example in FIGS. 1, 2, and 4, at 108. In this manner, the circumferential biasing force is exerted between the first and second ends 104 and 106. This biasing force, as previously described in part herein, is equal or equivalent to a preselected pressure-limit. For example, if the preselected limit is 50 psi, and this is the desired air pressure for a vehicle tire; the biasing force will be set and fabriced (or fabricated) or tempered into the constructive material of the arch-spring 98, so that when the back-pressure in a tire is greater than 50 psi, the arch-spring 98 will bend (or give way) from a first biasing position (on the check-reed member 58) to a second relief position (in relation thereto); allowing the check-reed member 58 to move within the check-reed position groove and allow air pressure to escape from the sound board emission port 48 (and internal valve pin channel 28).

It will be understood within the scope of the invention that the arch-spring 98 can be tempered and fabricated to produce the biasing force direction 108 in a number of ways, utilizing a number of construction materials. However, in preferred embodiments of the invention it is preferable to temper metal, steel or an alloy or related such metallic material (as is preferably utilized as construction or fabrication material for the entire Assembly 10), to the preselected biasing force equivalent described. Also, in preferred embodiments the arch-spring 98 takes the form of a single arc-like spring leaf, as illustrated.

Additionally, the first end 104 of the arch-spring 98 has the attachment flap portion 110, which is preferably flat and/or linear in its construction configuration, as illustrated by example in FIGS. 1, 2, 3A and 4 of the drawings. However, the flap 110 can be of other configurations to define or augment the desired biasing force, and to enhance support of the flap 110 on or in relation to the valve body 12.

The flap 110 is provided with inboard and outboard surfaces 112 and 114, respectively; and first and second end perimeters 116 and 118, respectively. The flap 110 further has support hole 120, positioned and defined between its inboard and outboard surfaces 112 and 114.

In preferred embodiments, the second end perimeter 118 of the flap 110 is attached to the first end 104 of the arch-spring 98. The flap 110 is further provided with the attachment member 122, which is utilized in preferred embodiments, by installing it into and through the support hole 120 to attach the flap 110 and arch-spring 98 to the side periphery 40 of the middle cross-sectional subportion 20 of the valve body 12 so that it will be in biasing position, as described and illustrated, in relation to the check-reed member 58. It will be understood within the scope of the invention that the flap 110 and arch-spring 98 can be installed on or in relation to the valve body 12 by a number of different attachment, support or securing means.

In preferred embodiments, as illustrated by example, the check-reed member 58 is round, spherical and/or globular in visual appearance and/or shape-configuration. In related regard, the check-reed 58 and the check-reed position groove 46 are configured and dimensioned; and the arch-spring 98 configured, dimensioned and spaced in relation to the check-reed 58; so that the check-reed 58 is supported and positionable within the check-reed position groove 46, to carry out the objects, purposes, functions and uses of the Assembly 10.

Also, as discussed in part herein, in preferred related embodiments, a part of the second channel portion 34, interfacing within and a part of the second cross-sectional subportion 22 of the valve body 12; is, preferably, provided with threaded area 74. And, preferably, by virtue of the positional alignment of threaded area 74 with the normally and conventionally provided threaded area of a tire valve stem or like device to be developed; the second end 16 and second cross-sectional subportion 22 is threadably mounted on a preexisting tire valve stem of a vehicle tire. It will be understood, however, within the scope of the invention, that the valve body 12 can be otherwise mounted to an air/fluid-pressurized tire, container, unit or vessel.

Another preferred embodiment within the scope and spirit of the present invention is illustrated by example in drawing FIGS. 4, 5, 6, and 10.

Figure 5:
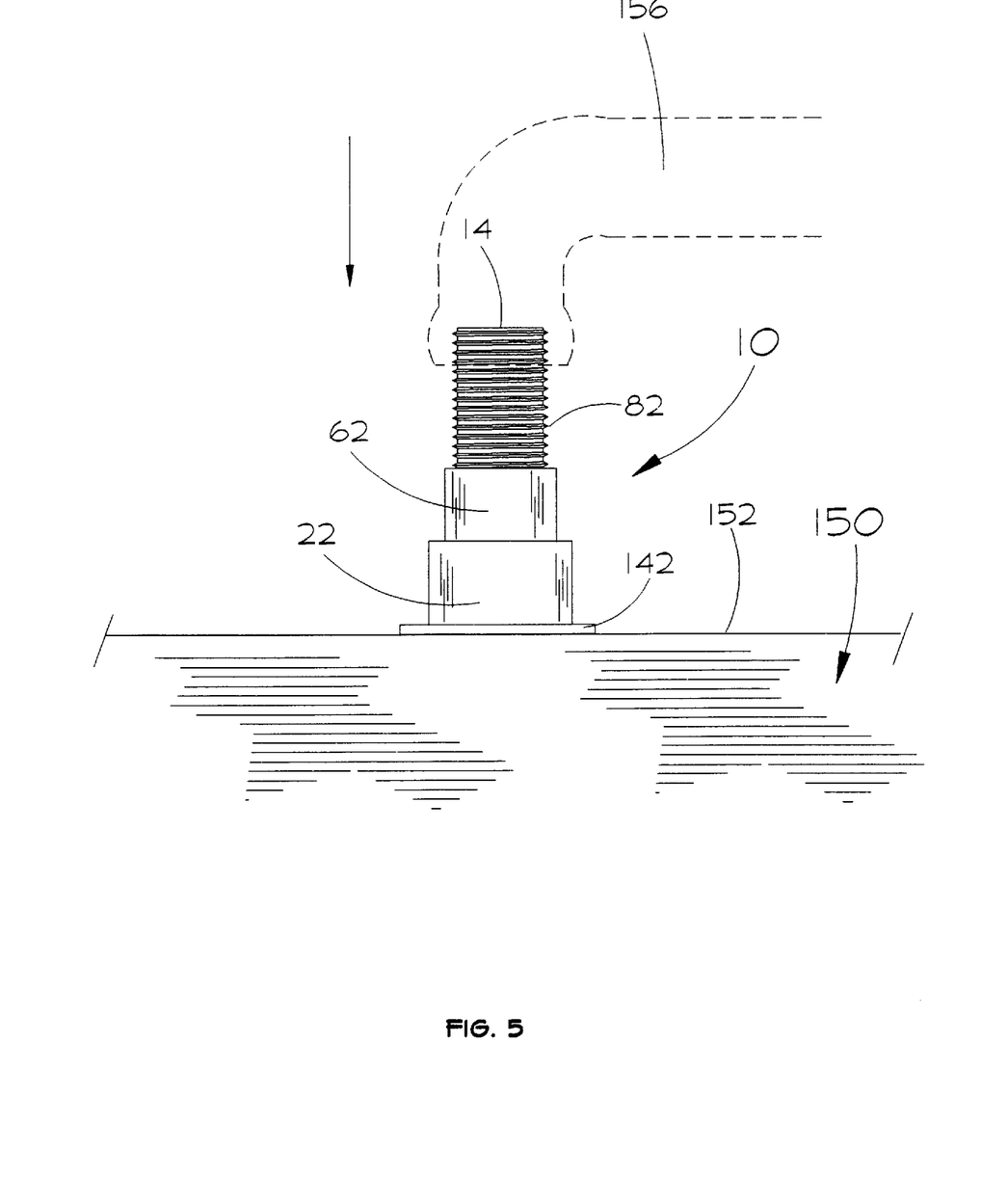
FIG. 5 is a side perspective showing the invention embodiment of FIG. 4 in assembled and installed position on a conventional tire rim shown in partial general detail. A conventional air hose nozzle is shown in broken lines.

In this and related preferred embodiments the Assembly 10 takes the form of an automatic tire pressure warning and limiting gauge assembly for use in interaction with a tire rim supporting an air or fluid pressurized tire, having at least one inflation hole (as those available conventionally do) along its side or widthwise periphery for providing an entry passage for inflating a mounted tire, or such a hole for the insertion of a conventional valve core or stem device; as illustrated generally by example in FIGS. 4 and 5.

As described in other embodiments set forth herein, the valve body 12 has first and second ends 14 and 16; and first, middle and second cross-sectional subportions 18, 20, and 22; therebetween. The adapted internal valve core channel 124 of these preferred embodiments is designed and dimensioned to receive and releasably mount the valve core 126 utilized. The middle cross-sectional subportion 18 is provided with at least the first flange member 36; and in related embodiments has the first and second flange members 36 and 38, or other like means for supporting and/or interfacing with the installed collar retention member 62.

The check-reed position groove 46 and sound board emission 48 are substantially as previously described, except that they communicate in this embodiment with the internal valve core channel 124.

In this embodiment the Assembly 10 and valve body 12 thereof, is provided with the valve core 126, which is removably installed within the valve core channel 124, so that its first end 128 is proximal or proximate positionally to the first end 14 of the valve body 12 within the first cross-sectional subportion 18; and its second end 130 is proximal or proximately positioned in relation to the second end 16 of the valve body, within the second cross-sectional subportion 22.

The check-reed member 58 having the rounded periphery surface 60, as earlier described, is movably and vibrationally mounted in the check-reed groove 46 so that a part or portion of the periphery surface 60 is exposed outboard of, or laterally extending from, the check-reed groove 46 as earlier described and illustrated.

The pressure sensitive arc means 61 is provided in this embodiment, as previously described and illustrated.

The collar retention member 62 is as previously described and illustrated; except, in this preferred embodiment it is employed to seat against and/or cover the single, first flange member 36, when so utilized in preferred embodiments, or other similar means for supporting and/or guiding the collar 62 in position adjoining the arc means 61. It will also be understood within the scope of the invention and all of its related preferred embodiments that the hollow installation channel 70 of the collar 61 further provides, after installed placement and positioning as described and illustrated, additional interfacing or interstitial spaces adjoining the arc means 61; and, by virtue of its open-ended channel 70, sound board emission port 72 and rounded periphery side 68; a further sound chamber and/or sound reporting or enhancing means of the present Assembly 10, supporting those others earlier described.

Figure 6:
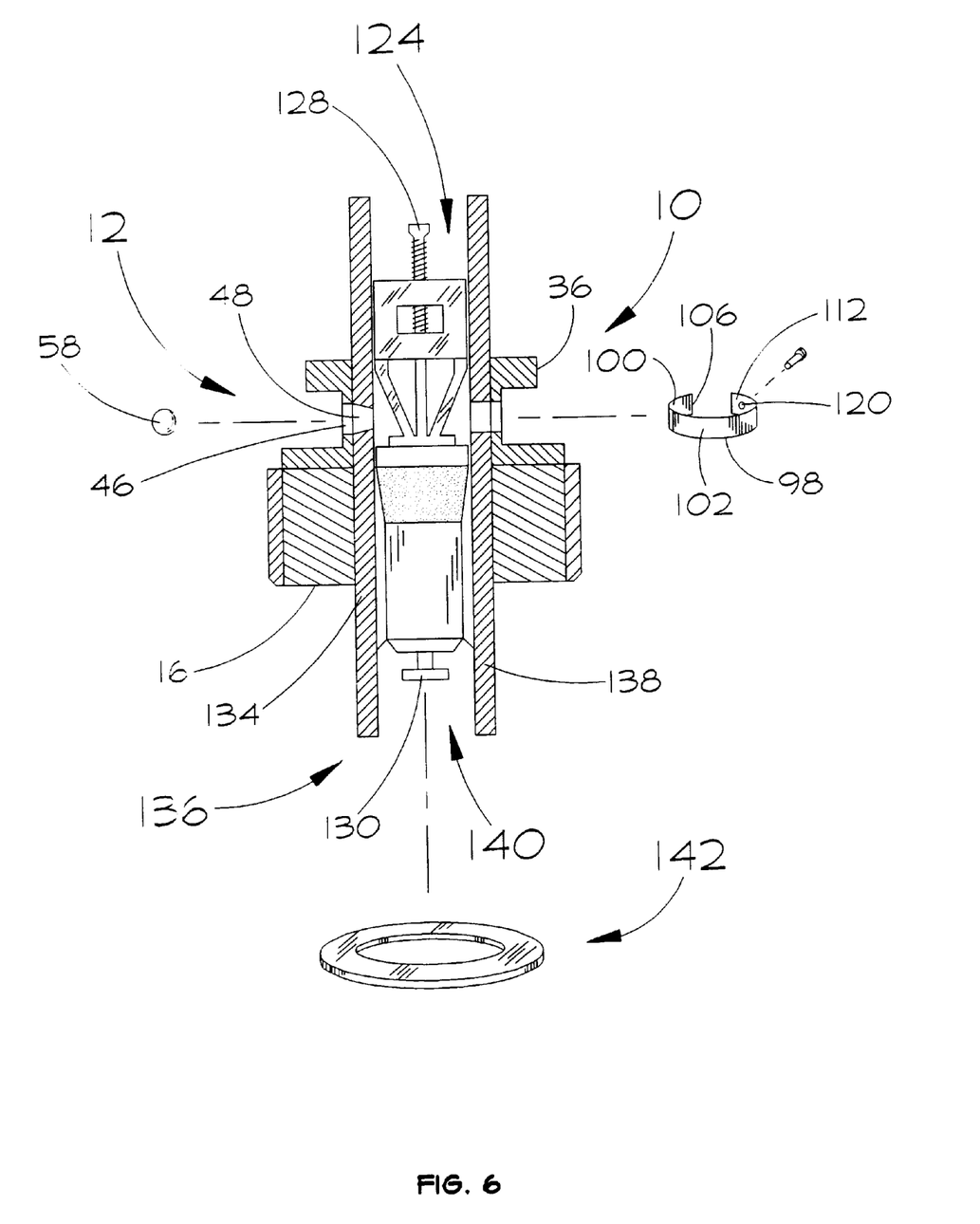
FIG. 6 is a partial cross-sectional view of another embodiment of the present invention, showing a valve core in general detail, which can be provided as a conventional valve core or valve stem core for utilization in the invention.
Figures 7A, 7B:
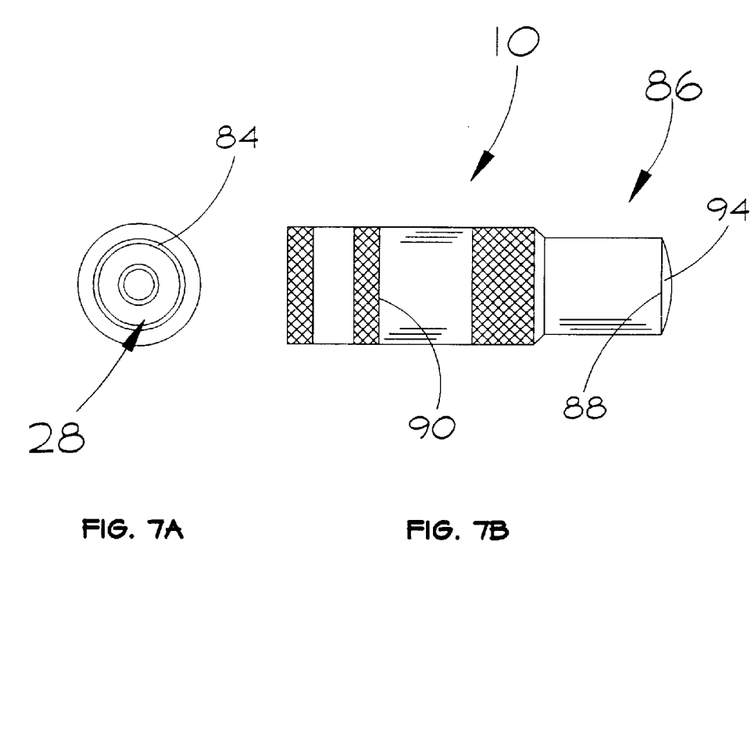
FIG. 7A is a bottom view of the invention embodiment of FIG. 1, showing the invention, in a preferred embodiment, as completely assembled.
FIG. 7B is a side perspective view of the embodiment of FIG. 7A.
Figure 7C:
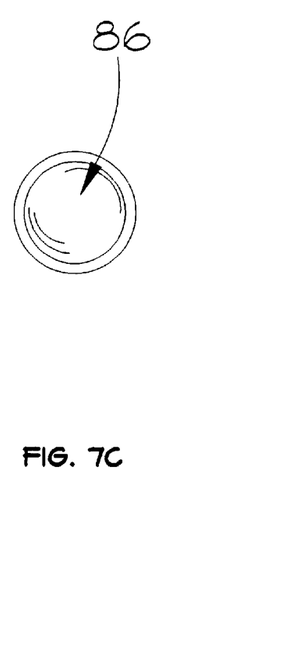
FIG. 7C is a top view of the invention of FIG. 7B.
Figure 8:
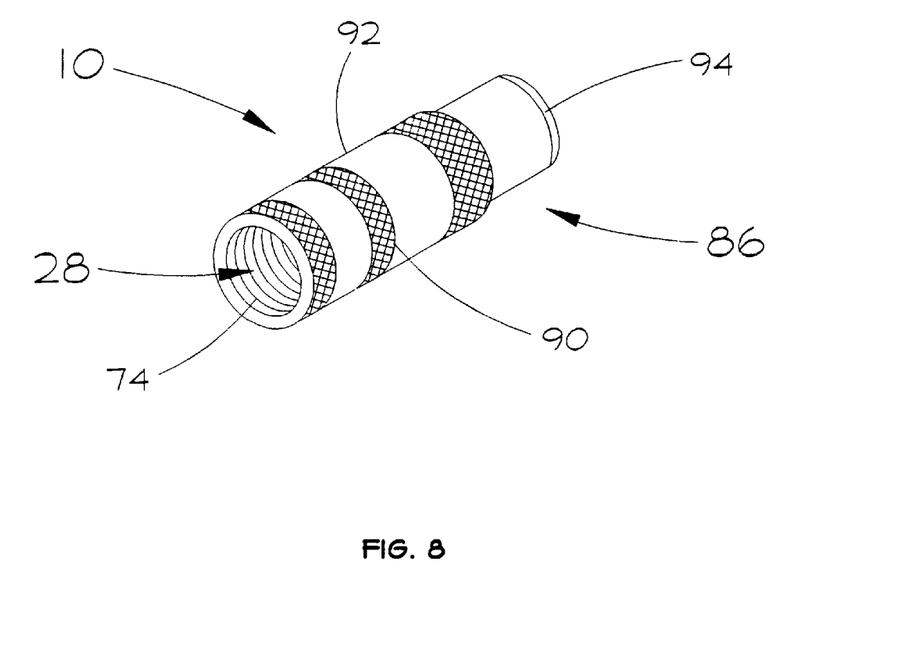
FIG. 8 is a front side perspective of the invention of FIG. 7B.
Figure 9:
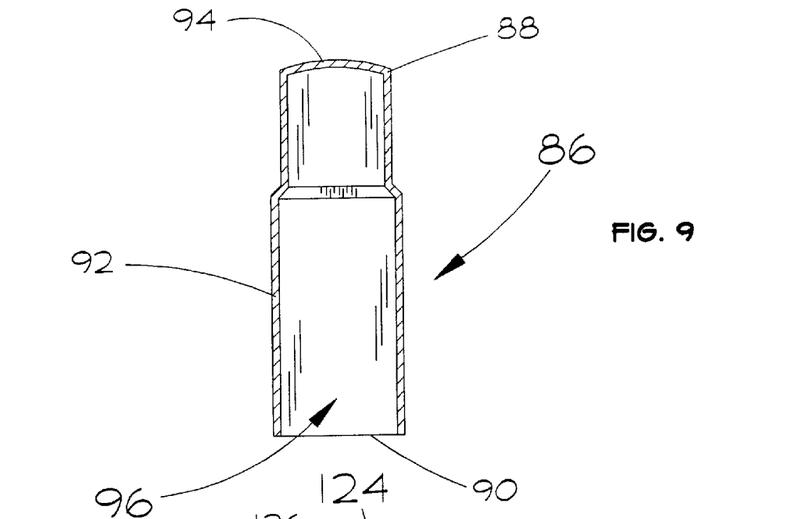
FIG. 9 is a cross-sectional view of another embodiment of the dust cover of the invention, illustrated in FIGS. 1, 7B and 8.
Figure 10:
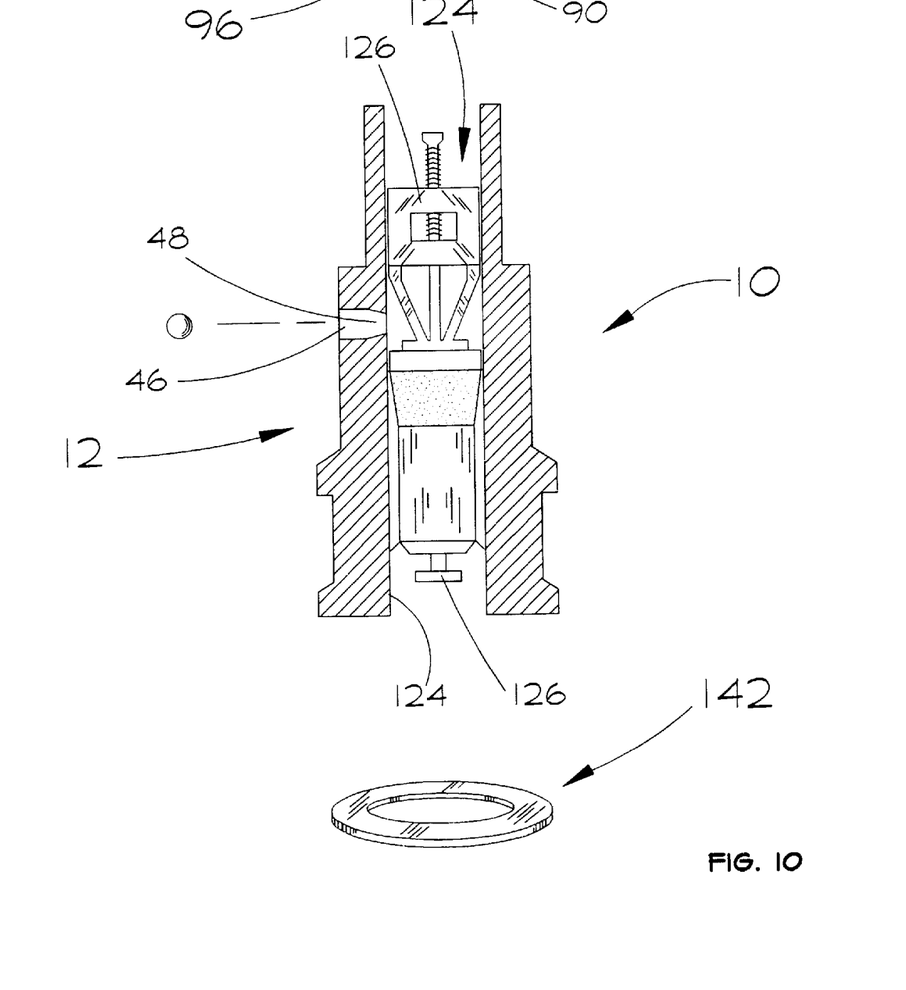
FIG. 10 is a partial cross-sectional view of another embodiment of the present invention showing a conventional valve piece or valve core utilized with the invention in this embodiment.

Additionally, in related preferred embodiments, the Assembly 10, and valve body 12 thereof, is provided with a threaded extension portion 132 which has first and second ends 134 and 136, respectively; outwardly threaded, periphery wall 138 and tire inflation interface channel 140 defined and provided between its first and second ends 134 and 136; as illustrated by example in FIGS. 4 and 6. It will also be understood within the scope of the invention that the valve body 12 can be provided, as illustrated in FIG. 10; and that the body 12 can otherwise be fixed, positioned and attached over, or communicating and adjoining with, a tire inflation hole or inflation entry space on a tire supporting rim or like object.

In preferred embodiments of the invention utilizing the threaded extension portion 132, the first end 134 of the portion 132, is attached integrally, or otherwise, to the second end 16 of the valve body 12 so that the inflation interface channel 140 communicates and interfaces with the internal valve core channel 124 of the valve body 12 in this embodiment.

Additionally, in related preferred embodiments, the threaded extension portion 132 is provided with washer and nut-locking means 142 for securing the periphery wall 138 under and within a tire rim. Such means 142 are preferably utilized as or comprising the first and second annular ring-like washers 144 and 146 (or plurality thereof) and a tightenable or pressure biasable, threaded locking nut 148 or similar member. As so provided, the first washer 144 (or like or integral washer element) is placed between the periphery wall 138 of the threaded extension portion 132 and the second cross-sectional subportion 22 of the valve body 12 so that the washer 144 seats up against the outside widthwise periphery 152 of a tire rim 150, as illustrated by example in partial (broken-lined) view in FIG. 4. The second washer is positioned over the periphery wall 138 of the threaded extension portion 132; and, in so doing, this second washer 146 is also positioned up against the inside widthwise periphery 154 of a tire rim 150. The locking nut 148 is threadably engaged and installed on the periphery wall 138 of the portion 132 and positioned and secured thereon to seat up against the second washer 146 to hold this portion onto a tire rim 150 and its peripheries 152 and 154. It will also be understood within the scope of the present invention that the extension portion 132, as connected to the valve body 12, can be provided without outward threading, and otherwise secured to the air inflation hole of a tire rim 150. The entire tire rim 150, and the air inflation hole on the widthwise periphery of a tire rim, are not illustrated in their entirety in the drawings, but only in general partial detail and broken lines. However, those skilled in the art will know of the common availability of such conventional tire rims with provided air inflation holes and the tire which they support.

In all of the described embodiments the Assembly 10 permits the user to install the Assembly 10 on each of a number of individual preexisting valve stem cores or tire rims, in accordance with the desired pressure limit desired for each respective tire; and to attach an air hose for air pressure inflation supply; and to remove the air supply hose from the Assembly 10 when air or air pressure is expelled and the Assembly 10 issues a reporting warning whistle, as described.

Accordingly, the appended claims are intended to cover all changes, modifications and alternative options and embodiments falling within the true breath, scope and spirit of the present invention. The reader is, therefore, requested to determine the scope of the invention by the appended claims and their legal equivalents, and not by the examples which have been given.

I claim:

1. An automatic tire pressure gauge for use in interaction with a valve core of a vehicle tire, for providing an audible warning of, and self-initiating and contemporaneous release of, air pressure rising to or above a preselected operation and safety limit, said automatic tire pressure gauge comprising:

a valve body having first and second ends, and first, middle and second cross-sectional subportions, said valve body defining an internal valve pin channel having diametered dimensions, extending, substantially, internally and axially therein between the first and second ends, and having first, middle and second channel portions, the first and second channel portions having respective dimensioned diameters greater than that of the middle channel portion, the middle cross-sectional subportion having first and second ends, in lengthwise positional orientation thereto, the first end defining and having a first flange member and the second end defining and having a second flange member, said middle cross-sectional subportion further defining and having a side periphery, in widthwise positional orientation thereto, the the first and second flange members each extending outboard, widthwise, in relation to the side periphery, said side periphery defining and having outward and internal surfaces, the internal surface adjoining and communicating with the internal valve pin channel, and the outward surface defining a check-reed position groove, the side periphery of said middle cross-sectional subportion further defining and having a sound board emission port, extending therein between said check-reed position groove and the internal valve pin channel;

a valve pin member having first and second end portions and the middle portion oriented lengthwise therebetween, the first and second end portions, each, having a widthwise dimension which is greater than that of the middle portion, said valve pin member being slideably installed in the middle channel portion of the internal valve pin channel, such that the valve pin member moves along the middle portion of the valve pin member between the first and second portions of the valve pin member;

a spherical check-reed member having a rounded periphery surface, being pivotally and vibrationally mounted in said check-reed position groove, such that part of the rounded periphery surface is exposed outboard of the check-reed position groove;

a pressure sensitive arc means for positionally supporting and circumferentially biasing the spherical check-reed member at a selected force equivalent equal to a desired air pressure limit, such that the spherical check-reed member is held in position in accordance with the selected force and will not move or vibrate until the selected force is exceeded, said pressure-sensitive arc means being attached to and supported by the side periphery of said middle cross-sectional subportion; and a collar retention member having first and second ends and a rounded periphery side therebetween, and defining a hollow installation channel extending between the first and second ends thereof, said rounded periphery side defining a orificial sound board emission port therethrough, said collar retention member being releasably attached to the valve body such that its hollow installation channel abuts each of the first and second flange members of the middle cross-sectional subportion thereof.

2. An automatic tire pressure warning and limiting assembly for use in interaction with a preexisting tire valve core on an individual tire of a vehicle, for providing an audible warning when a tire has been filled with, or is carrying, inflation air or fluid beyond a desired pressure, and a contemporaneous automatic self-limiting pressure release, said assembly comprising:

a valve body subassembly comprising:

a first portion, a second portion and a third portion, each of which has, at least, first and second ends, the first portion being attached at its second end to the first end of the second portion and the second portion being attached at its second end to the first end of the third portion, in sequence, and, as so connected, defining and having a length thereof, and defining an axially oriented, internal valve pin channel, extending, therethrough, the length thereof, the first portion further comprising a side periphery subportion connected and extending between the first and second ends, thereof, and having inboard and outboard periphery surfaces, the inboard periphery surface being positioned adjacent to the internal valve pin channel and the outboard periphery surface defining, thereabout, at least in part, a threaded area, the second portion further comprising a side periphery connected and extending between the first and second ends thereof, and having inboard and outboard periphery surfaces, the inboard periphery surface being positioned adjacent to the internal valve pin channel, the first end having a first end flange member connected thereto, and the second end having a second end flange member attached thereto, each having a first annular side portion extending toward the internal valve pin channel and a second annular side portion extending outboard of the side periphery, the side periphery defining a sound board emission port, extending between the inboard and outboard surface thereof having an outboard opening on the outboard surface, said second portion having a spherical check-reed member, positionally mounted adjacent to and covering the outboard opening of the sound board emission port of said side periphery thereof, and having pressure sensitive arc means for positionably supporting and circumferentially biasing the spherical check-reed member at a selected force equivalent to a desired tire air pressure, such that the spherical check-reed member is held in position in accordance with the selected force and will not move until the force is exceeded, said pressure-sensitive arc means being supportably attached to the side periphery of the second portion thereof, said second portion further having a collar retention member having first and second ends and a rounded periphery side therebetween, and defining a hollow installation channel extending between the first and second ends thereof, said rounded periphery side defining a orificial sound board emission port therethrough, said collar retention member being releasably attached to the second portion, and being removably installed over and adjacent to each of the first end and second end flange members, the second end of said collar retention member being adjacently positioned and removably connected to the third portion, said collar retention member acting to provide a stop limit position and related positional support for the, circumferentially biasing, pressure sensitive arc means, the third portion further comprising a side periphery connected and extending between the first and second ends thereof, having inboard and outboard surfaces, the inboard surface adjoining the internal valve pin channel;

a valve pin subassembly having a pin member, said pin member having first and second stop portions, and a middle portion extending therebetween, the first and second stop portions having widthwise or cross-sectional dimension which is greater than that of the middle portion, said pin member being installed in the internal valve pin channel such that slideable movement of the middle portion of the pin member is permitted therein between it first and second stop portions;

whereby, the second end of the third portion is installed in interaction with a preexisting tire valve core on an individual tire of a vehicle; and whereby, when a air pressure dispensing conduit, or air supply, is connected to the first portion of the assembly, it creates a back pressure which communicates through the sound board emission port and biases the spherical check-reed member and the positionally supporting and circumferentially biasing, pressure sensitive arc means, such that, when a force of the back pressure exceeds the selected force equivalent of the pressure sensitive arc means the spherical check-reed member is positioned outboard of the outboard opening of the sound board emission port, allowing air and pressure to escape and emit therethrough and to continue on through the orificial sound board emission port of the collar retention member, thereby emitting the air and pressure from the assembly to the environment and contemporaneously reporting an audible whistling sound from within, at least, a portion of interfacing spaces adjacent to the sound board emission port, the spherical check-reed member, the pressure sensitive arc means and the orificial sound board emission port.

3. The automatic tire pressure warning and limiting assembly of claim 2, wherein:

the valve pin subassembly further comprises a washer member, said washer member being rounded in configuration, having a ring-like periphery portion, and defining a pin channel inboard of the periphery portion, said washer member being installed within a portion of the internal valve pin channel on the annular portion of the second end flange member of said second portion.

4. The automatic tire pressure warning and limiting assembly of claim 3, wherein:

the assembly further comprises a dust cover member having first and second ends and a side periphery wall therebetween, the first end having a cover portion, said cover portion having a perimeter extending concurrently to the side wall periphery wall and having superior and inferior surfaces, and the second end defining a securement channel extending therefrom internally, generally to the inferior surface of the cover portion of the first end and defining as at least a part thereof a threaded portion compatible with the threaded area of the outboard periphery surface of the first portion;

whereby said dust cover member is threadably installed on the first portion when the assembly is installed in interaction with a preexisting tie valve core on an individual tire of a vehicle.

5. The automatic tire pressure warning and limiting assembly of claim 4, wherein:

the pressure sensitive arc means comprises a tempered arch member having inboard and outboard perimeter surfaces and first and second ends, and exerting a circumferentially biasing force between the first and second ends, the first end having a substantially linear, attachment flap portion, said attachment flap portion having inboard and outboard surfaces and first and second end perimeters, and defining a support hole between its inboard and outboard surfaces, the second end perimeter being attached to the first end of the tempered arch member, said flap portion further having an attachment member, the attachment member being guided through the support hole and fixedly attached to the side periphery of the second portion to attach and support the tempered arch member.

6. The automatic tire pressure warning and limiting assembly of claim 5, wherein:

the spherical check-reed member comprises a globular member, said globular member and the outboard opening of the sound board emission port being dimensioned, and the inboard perimeter of the tempered arch member being attached and spaced from the globular member, such that the globular is supported and positionable within the outboard opening.

7. The automatic tire pressure warning and limiting assembly of claim 6, wherein:

the inboard surface of the side periphery of said third potion defines, at least in part, a threaded area;

whereby said assembly is threadably mounted and installed in interaction with a preexisting tire valve core on an individual tire of a vehicle.

8. An automatic tire pressure warning and limiting gauge assembly, for use in interaction with a tire rim supporting a air or fluid pressured tire and having at least one inflation hole along its periphery, said assembly comprising:

a valve body having first and second ends, and first, middle and second cross-sectional subportions therebetween, each having a side perimeter, said valve body defining a internal valve channel having diametered dimensions, extending internally thereof between the first and second ends, the middle cross-sectional subportion having, at least, a first flange member extending cross-sectionally outboard of its side perimeter, and its side perimeter having outward and internal surfaces, the internal surface adjoining, and being in communication with, the internal valve channel, and the outward surface defining a check-reed position groove, the side perimeter of said middle cross-sectional subportion further defining and having a sound board emission port extending between the check-reed position groove and the internal surface thereof;

a valve core subassembly having first and second ends, and being removably installed within the internal valve channel such that its second end is positionally proximal to the second end of the valve body;

a spherical check-reed member having a rounded periphery surface, being movably and vibrationally mounted in the check-reed position groove, such that a portion of the rounded periphery surface thereof is exposed outboard of said check-reed position groove;

a pressure sensitive arc means for positionally supporting and circumferentially biasing the portion, exposed, of the rounded periphery surface of the spherical check-reed member, at a selected force equivalent equal to a desired air pressure limit, such that the spherical check-reed member is held in static sealing position in accordance with the selected force and will not move or vibrate until the selected force is exceeded, said pressure sensitive arc means being attached to and supported by the side perimeter of the middle cross-sectional subportion of said valve body; and a collar retention member having first and second ends and a rounded periphery side therebetween, and defining a hollow installation channel extending between the first and second ends thereof, said rounded periphery side defining a orificial sound board emission port therethrough, said collar retention member being removably installed on the valve body such that its hollow installation channel abuts the, at least, first flange member of the middle cross-sectional subportion thereof.

9. The automatic tire pressure warning and limiting gauge assembly of claim 8, wherein:

said assembly further comprises a extension portion having first and second ends and a periphery wall therebetween, and defining an internal inflation interface channel extending between the first and second ends, said extension channel being attached to the second cross-sectional subportion such that the internal inflation interface channel communicates with the internal valve channel of said valve body.

10. The automatic tire pressure warning and gauge assembly of claim 9, wherein:

the extension portion further comprises securement and sealing means for installably attaching and sealing the extension portion and valve body to, and in relation to, a tire rim.

\* \* \* \* \*